Aug. 18, 1959     J. L. GRATZMULLER     2,899,974

NON-RETURN BALL VALVE FOR RECIPROCATING HYDRAULIC PUMPS

Filed Jan. 26, 1954

*Inventor*
Jean Louis Gratzmuller
By
Brown & Seward
*Attorneys*

United States Patent Office 2,899,974
Patented Aug. 18, 1959

2,899,974

NON-RETURN BALL VALVE FOR RECIPROCATING HYDRAULIC PUMPS

Jean Louis Gratzmuller, Paris, France

Application January 26, 1954, Serial No. 406,262

Claims priority, application France February 3, 1953

1 Claim. (Cl. 137—533.11)

The present invention relates to reciprocating hydraulic pumps and has for its purpose to provide an improved non-return ball valve to be used in such pumps, in which a proper operation of the admission and exhaust valves is of the utmost importance.

I have found that mechanically-controlled valves have a certain number of drawbacks which could be avoided by the use of automatically operated valves and, more particularly, of non-return ball valves. However, most of the known non-return ball valves are provided with a spring urging the ball against its seat, which gives rise to rapid erosion of said seat by impurities carried by the liquid to be pumped.

An object of my invention is to provide a non-return ball valve for hydraulic reciprocating pumps, in which the ball is actuated solely by the liquid being pumped.

Furthermore, in all known non-return ball valves for hydraulic pumps, the seat is more or less rapidly destroyed by the ball rapidly displaced by the liquid and forcefully brought into contact with the seat without proper guiding.

Another object of my invention is to provide a non-return ball valve, wherein the ball is accurately guided in a tubular member integral and coaxial with the seat, so that said ball is always perfectly centered with respect to said seat.

A further object of my invention is to provide a valve of this type, the seat of which is originally formed in a seat member made of a metal softer than the ball, by "printing" the shape of said ball on said seat member.

Due to this mode of formation of the seat, in operation, the impact of the ball on the seat will always affect the whole area of the seat which will be deformed as a whole and very slowly under the repeated shocks of the ball.

A still further object of my invention is to form such seat as described in the preceding paragraph on the originally sharply machined edge of a seat member, whereby said slow deformation of the seat will cause, after a comparatively small number of operations, such an increase of the seat area that the ball will no more be capable of further deforming the seat member.

In a hydraulic pump, it is indispensable that the total loss of pressure through a valve (this is particularly critical for the admission valve of a pump fed under constant pressure e.g. atmospheric) be as slight as possible which implies, inter alia, for a given cross-section of the valve port, a minimum lifting stroke of the ball.

Now, to obtain a maximal volumetric efficiency with a ball valve according to the invention the "counterflow" required to close the valve should be reduced to a minimum, which implies a limitation of the ball lifting to a level as near as possible to said minimum lifting stroke.

A further object of my invention is therefore to provide through the wall of the guiding tubular member of the valve a passage constituted by a plurality of holes located between the seat and the ball, even in the seated position of the latter, while abutment means are provided on said tubular member to limit the lifting stroke of the ball substantially to said minimum value.

Finally, in order to avoid any sticking of the ball against the above mentioned abutment means, a more particular object of my invention is to design said means under the shape of a gudgeon-pin of small diameter, extending diametrically across the tubular guide, which reduces the abutment area to the point of tangency between said gudgeon-pin and said ball.

Other objects and advantages of the invention will be apparent from the following detailed description, together with the accompanying drawings, submitted for purposes of illustration only and not intended to define the scope of the invention, reference being had for that purpose to the subjoined claim.

Figure 1:
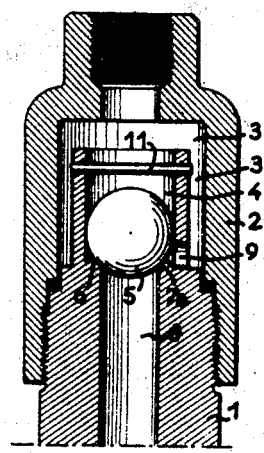
Fig. 1 is an axial sectional view of a ball non-return valve according to the invention shown before the formation of its seat.
Figure 2:
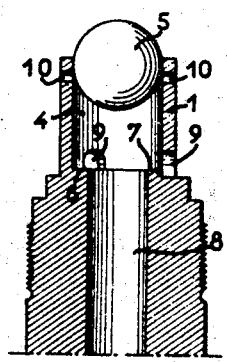
Fig. 2 is a view corresponding to Fig. 1, but showing the seat of the ball after its formation.
Figure 3:
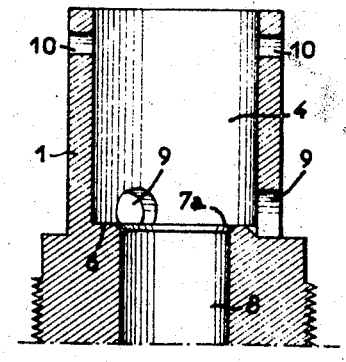
Fig. 3 is an enlarged view showing the seat member after the formation of the seat.

As shown in the drawings, the ball non-return valve according to the invention is essentially constituted by a one-piece tubular member 1 secured in a body 2 provided with a cylindrical hollow space 3 constituting the valve chamber and coaxial with the tubular member 1, so as to form with the same an annular space 3a. The tubular member 1 is provided with two successive cylindrical bores of different diameters, one of which, 8, constitutes the valve port, while the other one, 4, constitutes a guide for the ball 5 of the valve, said cylindrical portions 8 and 4 being separated by an annular shoulder 6 having a sharp edge 7. Ball 5 is slidably mounted in guide 4 with such a fit as to be suitably centered with respect to the sharp edge 7 of the annular shoulder 6, while being capable of moving under the action of the liquid, as explained hereunder.

According to the invention, the seat of the ball is formed on the sharp edge 7 by a deformation of the latter under the action of the ball 5 proper or a ball of the same size. For this purpose, as shown in Fig. 1, the ball is first engaged into its guide 4, brought into contact with the sharp edge 7 and then pressed e.g. by means of a hydraulic press, so as to "print" its own shape into the metal of the annular shoulder 6.

For this purpose, ball 5 is made of a hard steel, while said annular shoulder 6 is made of a softer steel, so that it can be permanently deformed by ball 5 practically without any permanent deformation of the latter. Now, accurately machined hard steel balls are easily found on the market since they are manufactured in great quantities for ball bearings.

It is to be noted that the spherical shape of a valve movable member constituted by a ball is the best adapted to the purposes of the present invention, since its guiding merely requires the guiding of a point (the center of the ball) along a line (the axis of the valve). In other words, a ball accurately guided in a cylindrical tubular member according to the invention will always offer an identical surface of contact to a seat formed as described above, said surface of contact being constituted by a portion of the theoretical sphere of ball 5.

The above described mode of formation of the seat 7a by deformation of the sharp edge 7 of the annular shoulder 6 offers, due to the perfect relative centering of said ball and seat, the main following advantages.

It ensures a perfect tightness of the valve together with a comparatively small area of the seat and it makes the life of the seat practically endless.

In fact, since the impact of ball 5 always occurs on the whole area of the seat 7a this avoids small local permanent deformations, the repetition of which causes with time a total destruction of the usual seat. On the contrary, the slow deformation due to the successive shocks of the ball on the seat affects said whole area and results in a progressive increase of the same due to the sharp shape of the edge in which seat 7 is formed. Thus, after a number of operations, the unitary pressure exerted by the ball on the seat becomes unsufficient to further deform the latter. This possibility of limiting the deformation of the seat to a maximum area consistent with a good operation of the valve has been shown by numerous very high pressure tests.

According to another feature of the invention, orifices, such as 9, are drilled in the wall of the guiding portion of the tubular member 1, in the near vicinity of seat 7a. It is advantageous to give to said orifices 9 a total area as great as possible and at least equal to the cross-section of port 8, so as to reduce to a minimum the over-all loss of pressure through the valve. On the other hand, the upper level of said orifices must be located under the line of contact of ball 5 with a guide 4, when the ball is seated, so that they cannot affect the guiding action of guide 4. Moreover, the ratio between the diameter of port 8 and that of guide 4 is preferably chosen between 1/3 and 3/4. Experiments on several thousand valves have shown that these valves seem to correspond to the acceptable limits of the inclination of the seat with respect to the valve axis. These tests also seem to show that the best value of this ratio would be 2/3.

Finally, two diametrically opposed holes 10 are provided in the wall of the guiding portion of the tubular member 1 to receive a gudgeon-pin 11, the function of which is to limit to a well-defined value the lifting stroke of ball 5. It is convenient to take this value equal to 1/4 of the ball diameter, so that the area of the passage between the seat and the ball, when fully opened, is equivalent to the cross-section of port 8.

The diameter of said gudgeon-pin 11 is preferably materially smaller than the diameter of ball 5, so as to provide for the latter a very small abutment area, theoretically reduced to a point (the point of mutual tangency along the axis of the valve of a great circle of the sphere with the circular outline of the gudgeon pin).

Figure 4:
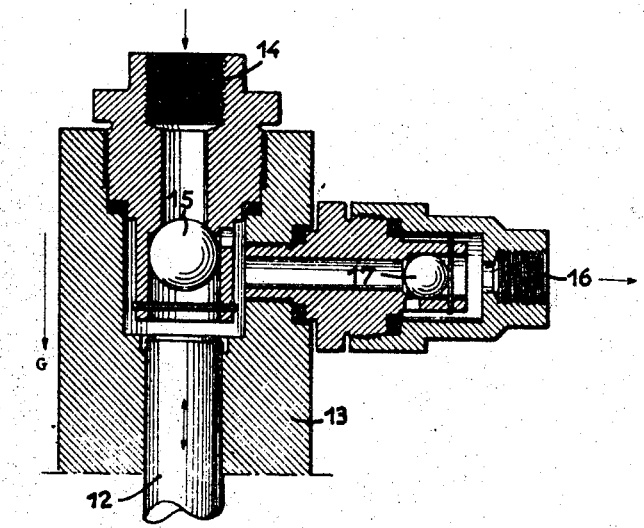
Fig. 4 is a diagrammatic axial sectional view of a portion of a hydraulic pump provided with two ball non-return valves according to the invention.

Fig. 4 shows an embodiment of a portion of a hydraulic pump essentially constituted by a piston 12 slidably mounted in a cylinder 13 having an inlet 14 provided with an admission ball valve 15 and an outlet 16 provided with an exhaust ball valve 17.

In order to indicate in the drawing the respective upward and downward vertical directions, an arrow g corresponding to gravity has been drawn. As shown, the exhaust valve ball stroke is horizontal, so that it is not affected by gravity, while the admission valve ball closes upwardly, i.e., against gravity, under the driving action of the liquid "counter flow." This has been explained to show that the pump valves according to the invention operate in any position. Furthermore, tests especially with high rate hydraulic pumps equipped with any valves, have shown that the volumetric efficiency does not depend on the position of the pump with respect to the vertical direction.

What is claimed is:

A ball check valve comprising a casing providing a cylindrical valve chamber having an open end and a fluid outlet port, a cylindrical seat member inserted in said open end of the valve chamber and having an inlet portion provided with an axial bore and a tubular cage portion coaxial with said bore and extending longitudinally within said valve chamber, the internal diameter of said cage portion being greater than the diameter of said bore to provide an internal annular shoulder forming a valve seat, and the external diameter of said cage portion being smaller than the diameter of said valve chamber so as to provide an annular clearance space of full flow capacity therebetween, said external diameter of the cage portion being also smaller than the external diameter of said inlet portion so as to provide an external shoulder spaced below the plane of the internal shoulder, a freely floating ball valve confined in said cage portion with just sufficient clearance for free longitudinal movement with respect to said seat and adapted to engage the latter, abutment means for trapping said ball valve in said cage portion, and a plurality of apertures provided in the base of said cage portion to permit the fluid which passes the ball valve when displaced from its seat to escape through said apertures into said annular clearance space, the total area of said apertures being at least as large as the area of the seat bore, said apertures extending each from said external shoulder to a plane transverse of said cage portion nearer said internal shoulder than the line contact with the cage portion of the ball valve when seated, so that the surface of the ball valve can at no time be abraded by the edges of said apertures, said internal shoulder being provided with a depression for each said aperture extending radially outwardly and downwardly from the valve seat to the bottom of the adjacent aperture.

References Cited in the file of this patent

UNITED STATES PATENTS

| 136,412 | Chapman et al. | Mar. 4, 1873 |
| 152,844 | Johnston | July 7, 1874 |
| 1,196,862 | Hayes | Sept. 5, 1916 |
| 1,627,574 | Phillippi | May 10, 1927 |
| 1,659,329 | Neller | Feb. 14, 1928 |
| 1,670,324 | Teahen | May 22, 1928 |
| 1,847,068 | Campbell | Mar. 1, 1932 |
| 1,859,479 | Thwaits | May 24, 1932 |
| 1,993,567 | Richardson | Mar. 5, 1935 |
| 2,044,629 | Parker | June 16, 1936 |
| 2,069,153 | Konkle | Jan. 26, 1937 |
| 2,107,704 | Kronquest | Feb. 8, 1938 |
| 2,611,045 | Wayman | Sept. 16, 1952 |

FOREIGN PATENTS

| 849,370 | France | Aug. 11, 1939 |
| 663,361 | Great Britain | Dec. 19, 1951 |

OTHER REFERENCES

Ser. No. 545,016, Bazley (A.P.C.), published Oct. 4, 1949.